US012695514B2

(12) United States Patent
Suzuki et al.

(10) Patent No.: US 12,695,514 B2
(45) Date of Patent: Jul. 28, 2026

(54) OPTICAL COMMUNICATION APPARATUS, AND OPTICAL COMMUNICATION SYSTEM

(71) Applicant: NEC Corporation, Tokyo (JP)

(72) Inventors: Yuta Suzuki, Tokyo (JP); Morihiko Ota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 312 days.

(21) Appl. No.: 18/283,111

(22) PCT Filed: Dec. 22, 2021

(86) PCT No.: PCT/JP2021/047707
§ 371 (c)(1),
(2) Date: Sep. 20, 2023

(87) PCT Pub. No.: WO2022/201696
PCT Pub. Date: Sep. 29, 2022

(65) Prior Publication Data
US 2024/0171284 A1      May 23, 2024

(30) Foreign Application Priority Data

Mar. 24, 2021      (JP) ................................. 2021-050738

(51) Int. Cl.
| H04B 10/572 | (2013.01) |
| H04B 10/079 | (2013.01) |
| H04J 14/02 | (2006.01) |

(52) U.S. Cl.
CPC ....... H04B 10/572 (2013.01); H04B 10/0795 (2013.01); H04J 14/0221 (2013.01)

(58) Field of Classification Search
CPC .............. H04B 10/572; H04B 10/0795; H04B 10/07953; H04J 14/0221; H04J 14/02; H04J 14/0271; H04J 14/0307; H04J 14/028
See application file for complete search history.

(56) References Cited

U.S. PATENT DOCUMENTS

2021/0234617 A1 * 7/2021 Saito ..................... H01S 5/0014

FOREIGN PATENT DOCUMENTS

| EP | 3104537 A1 * 12/2016 ........... H04B 10/572 |
| JP | 2016-131273 A 7/2016 |

(Continued)

OTHER PUBLICATIONS

International Search Report for PCT Application No. PCT/JP2021/047707, mailed on Mar. 15, 2022.

*Primary Examiner* — Hibret A Woldekidan
(74) *Attorney, Agent, or Firm* — Sughrue Mion, PLLC

(57)      ABSTRACT

Provided are an optical communication apparatus, an optical communication method, and an optical communication system that each can improve transmission characteristics. An optical communication apparatus includes a monitor unit configured to, when the optical communication apparatus connects to an optical communication network and converts an optical signal received from another optical communication apparatus to a digital signal, monitor a reception waveform of the optical signal, the optical communication network including a plurality of optical communication apparatuses connected via a transmission line that transmits WDM signal light in which a plurality of optical signals are wavelength-division multiplexed; and a center wavelength controlling unit configured to, based on the monitored reception waveform, feedback-control a center wavelength of a transmission waveform of an optical signal that the other optical communication apparatus transmits.

14 Claims, 13 Drawing Sheets

(56)     References Cited

FOREIGN PATENT DOCUMENTS

| JP | 2019-016986 | A | 1/2019 |
|----|-------------|---|--------|
| JP | 2019-054404 | A | 4/2019 |
| JP | 2019-213062 | A | 12/2019 |

* cited by examiner

DYNAMIC CONTROL                    DYNAMIC CONTROL

OPTICAL COMMUNICATION APPARATUS, AND OPTICAL COMMUNICATION SYSTEM

This application is a National Stage Entry of PCT/JP2021/047707 filed on Dec. 22, 2021, which claims priority from Japanese Patent Application 2021-050738 filed on Mar. 24, 2021, the contents of all of which are incorporated herein by reference, in their entirety.

TECHNICAL FIELD

The present invention relates to optical communication apparatuses, optical communication methods, and optical communication systems.

BACKGROUND ART

Patent Literature 1 describes an optical transmission system that measures the bit error rate (BER) of received signals at a receiver-side transponder unit and provides feedback to the transmitter side.

Patent Literature 2 describes a transmission apparatus that calculates an index value for narrowing an optical signal by calculating an error in the sampling timing held when a clock signal is extracted from the optical signal.

Patent Literature 3 describes a transmission apparatus that monitors a phase shift of optical signals and prevents the wavelength adjacent to the outer edge of the transmission band from approaching the outer edge.

CITATION LIST

Patent Literature

Patent Literature 1: Japanese Unexamined Patent Application Publication No. 2019-213062
Patent Literature 2: Japanese Unexamined Patent Application Publication No. 2019-054404
Patent Literature 3: Japanese Unexamined Patent Application Publication No. 2016-131273

SUMMARY OF INVENTION

Technical Problem

Two background issues, namely, narrowing of a used wavelength band for an increased channel occupancy in a WDM system and a decrease in passband characteristics due to the size reduction of a wavelength selective switch (WSS) lead to the narrowing of a wavelength band and in turn leads to a problem of lower transmission characteristics.

In view of the foregoing problem, the present disclosure is directed to providing an optical communication apparatus, an optical communication method, and an optical communication system that each can improve transmission characteristics.

Solution to Problem

An optical communication apparatus according to one example embodiment includes: a monitor unit configured to, when the optical communication apparatus connects to an optical communication network and converts an optical signal received from an other optical communication apparatus to a digital signal, monitor a reception waveform of the optical signal, the optical communication network including a plurality of optical communication apparatuses connected via a transmission line that transmits WDM signal light in which a plurality of optical signals are wavelength-division multiplexed; and a center wavelength controlling unit configured to, based on the monitored reception waveform, feedback-control a center wavelength of a transmission waveform of the optical signal that the other optical communication apparatus transmits.

An optical communication method according to one example embodiment includes: a step of, when an optical communication apparatus connected to an optical communication network converts an optical signal received from an other optical communication apparatus to a digital signal, monitoring a reception waveform of the optical signal, the optical communication network including a plurality of optical communication apparatuses connected via a transmission line that transmits WDM signal light in which a plurality of optical signals are wavelength-division multiplexed; and a step of, based on the monitored reception waveform, feedback-controlling a center wavelength of a transmission waveform of the optical signal that the other optical communication apparatus transmits.

An optical communication system according to one example embodiment includes an optical communication network including a plurality of optical communication apparatuses connected via a transmission line that transmits WDM signal light in which a plurality of optical signals are wavelength-division multiplexed. The optical communication apparatus includes: a monitor unit configured to, when an optical signal received from an other optical communication apparatus is converted to a digital signal, monitor a reception waveform of the optical signal; and a center wavelength controlling unit configured to, based on the monitored reception waveform, feedback-control a center wavelength of a transmission waveform of the optical signal that the other optical communication apparatus transmits.

An optical communication system according to one example embodiment includes an optical communication network including a plurality of optical communication apparatuses connected via a transmission line that transmits WDM signal light in which a plurality of optical signals are wavelength-division multiplexed, and a network management apparatus configured to manage the optical communication network. The network management apparatus includes: a monitor unit configured to, when a second optical communication apparatus that has received an optical signal transmitted by a first optical communication apparatus converts the optical signal to a digital signal, monitor a reception waveform of the optical signal; and a center wavelength controlling unit configured to, based on the monitored reception waveform, feedback-control a center wavelength of a transmission waveform of the optical signal that the first optical communication apparatus transmits.

Advantageous Effects of Invention

One example embodiment provides an optical communication apparatus, an optical communication method, and an optical communication system that each can improve transmission characteristics.

EXAMPLE EMBODIMENT

Figure 1:
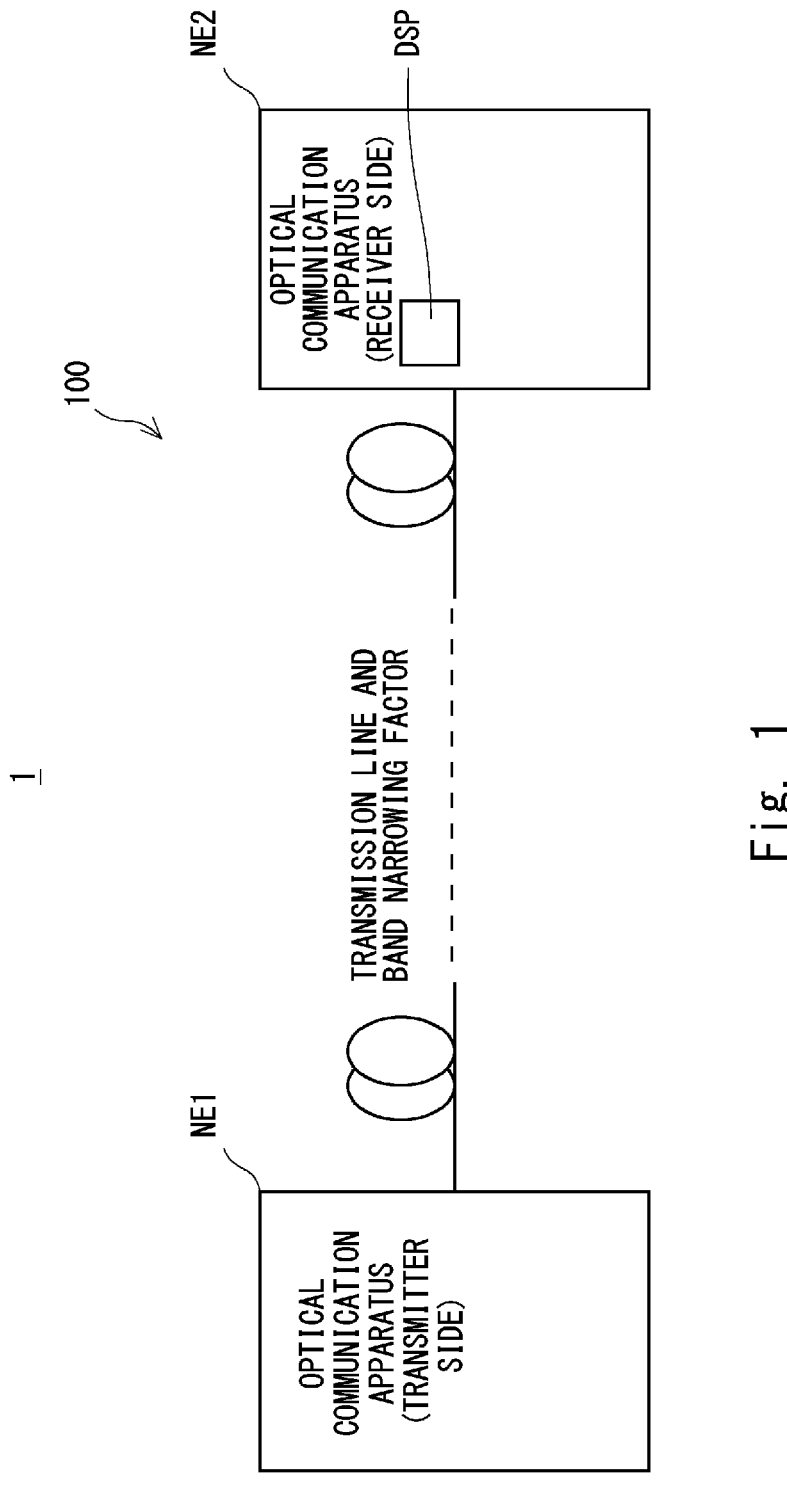
FIG. 1 is a configuration diagram showing an example of an optical communication system according to an example embodiment.

Hereinafter, some example embodiments will be described with reference to the drawings. In the following description and drawings, omissions and simplifications are made, as appropriate, to make the description clearer. In the drawings, identical elements are given identical reference characters, and their repetitive description is omitted, as necessary.

Outline of Example Embodiment

Prior to describing example embodiments of the present disclosure, an overview of an example embodiment according to the present disclosure will be provided. First, an optical communication system will be described. Thereafter, an optical communication apparatus and then an optical communication method will be described. Furthermore, another optical communication system and a network management apparatus will be described.

[Optical Communication System]

An optical communication system according to an example embodiment will be described. FIG. 1 is a configuration diagram showing an example of an optical communication system according to an example embodiment. As shown in FIG. 1, an optical communication system 1 includes an optical communication network 100. The optical communication network 100 includes a plurality of optical communication apparatuses NE1 and NE2. Although the figure shows two optical communication apparatuses NE1 and NE2, there is no limitation on the number of optical communication apparatuses NE1 and NE2. The optical communication apparatuses NE1 and NE2 are connected to a network via a transmission line. Thus, the optical communication network 100 is constituted as the plurality of optical communication apparatuses NE1 and NE2 become connected via the transmission line. Optical communication apparatuses NE may be connected point-to-point, in a ring topology, or in a mesh topology. Herein, the optical communication apparatuses NE1 and NE2 are collectively referred to as an optical communication apparatus NE.

The transmission line transmits wavelength division multiplexing (WDM) signal light in which a plurality of optical signals are wavelength-division multiplexed. WDM signal light is transmitted from the transmitter-side optical communication apparatus NE1 to the receiver-side optical communication apparatus NE2. When WDM signal light is transmitted from the optical communication apparatus NE2 to the optical communication apparatus NE1, the optical communication apparatus NE2 is the transmitter side, and the optical communication apparatus NE1 is the receiver side.

Each optical communication apparatus NE is a node in the optical communication network 100. The optical communication apparatus NE may be connected to a transmitter and a receiver (neither illustrated) via a communication circuit. The optical communication apparatus NE may function as a multiplexing device, a relay device, and a demultiplexing device through Reconfigurable Optical Add and Drop Multiplexing (ROADM) control. The optical communication network 100 transmits an optical signal by wavelength division multiplexing (WDM).

The receiver-side optical communication apparatus NE2 receives WDM signal light transmitted by the transmitter-side optical communication apparatus NE1. The optical communication apparatus NE2 splits a predetermined optical signal from the received WDM signal light. The receiver-side optical communication apparatus NE2 converts the split optical signal to a digital signal. For example, each optical communication apparatus NE includes a digital signal processing unit DSP. The digital signal processing unit DSP in the receiver-side optical communication apparatus NE2 converts a received optical signal to a digital signal.

[Optical Communication Apparatus]

Figure 2:
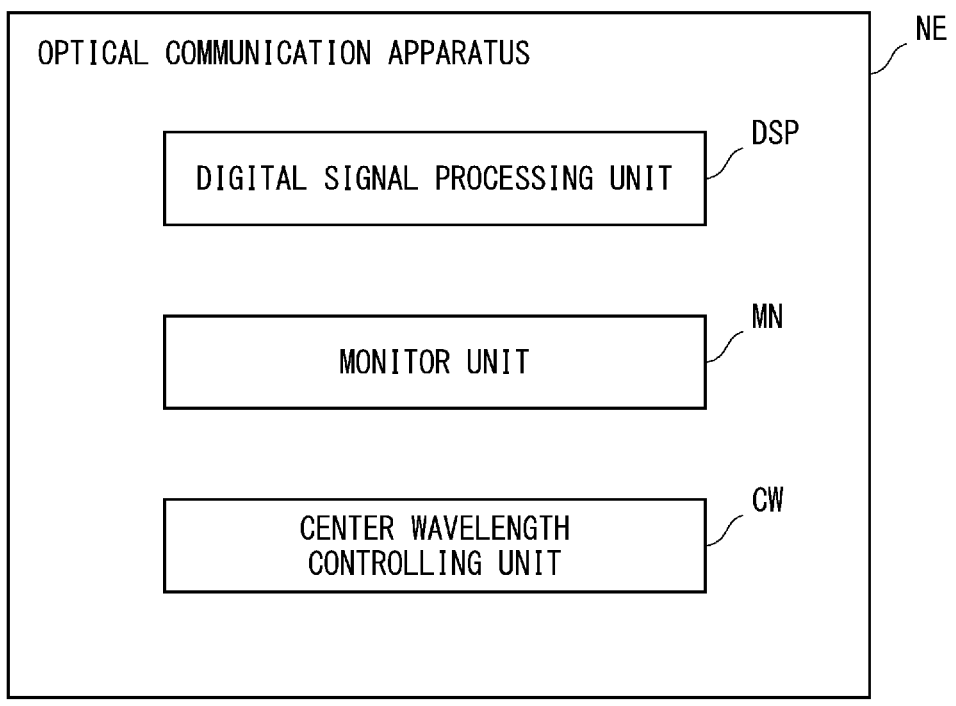
FIG. 2 is a block diagram showing an example of an optical communication apparatus according to an example embodiment.

Next, an optical communication apparatus will be described. FIG. 2 is a block diagram showing an example of an optical communication apparatus NE according to an example embodiment. As shown in FIG. 2, the optical communication apparatus NE includes a digital signal processing unit DSP, a monitor unit MN, and a center wavelength controlling unit CW. The digital signal processing unit DSP, the monitor unit MN, and the center wavelength controlling unit CW have functions as, respectively, a digital signal processing means, a monitor means, and a center wavelength controlling means.

The digital signal processing unit DSP converts a received optical signal to a digital signal. The monitor unit MN, when an optical signal received from another optical communication apparatus NE is converted to a digital signal, monitors the reception waveform of the optical signal. Based on the monitored reception waveform, the center wavelength controlling unit CW feedback-controls the center wavelength of a transmission waveform of an optical signal that the other optical communication apparatus NE transmits.

Figure 3:
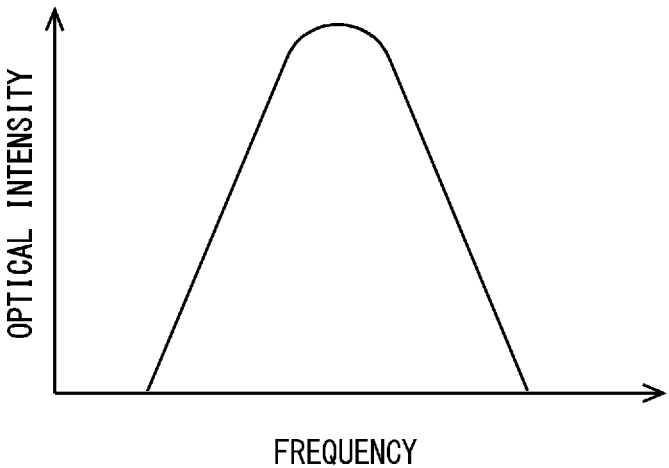
FIG. 3 shows an example of a reception waveform of an optical signal received by a receiver-side optical communication apparatus according to an example embodiment, in which the horizontal axis represents the frequency and the vertical axis represents the optical intensity.

FIG. 3 shows an example of a reception waveform of an optical signal received by a receiver-side optical communication apparatus NE2 according to an example embodiment, in which the horizontal axis represents the frequency and the vertical axis represents the optical intensity. As shown in FIG. 3, the optical signal received by the receiver-side optical communication apparatus NE2 has its analog reception waveform monitored by the monitor unit MN when the optical signal is converted to a digital signal by the digital signal processing unit DSP. Herein, the horizontal axis may represent the wavelength of the optical signal. Thus, the monitor unit MN monitors the reception waveform indicating a relationship of the optical intensity to the wavelength or frequency of the optical signal. The monitor unit MN may monitor the center wavelength or center frequency of the reception waveform. Alternatively, the monitor unit MN may monitor the shape including the bandwidth of the reception waveform.

Figure 4:
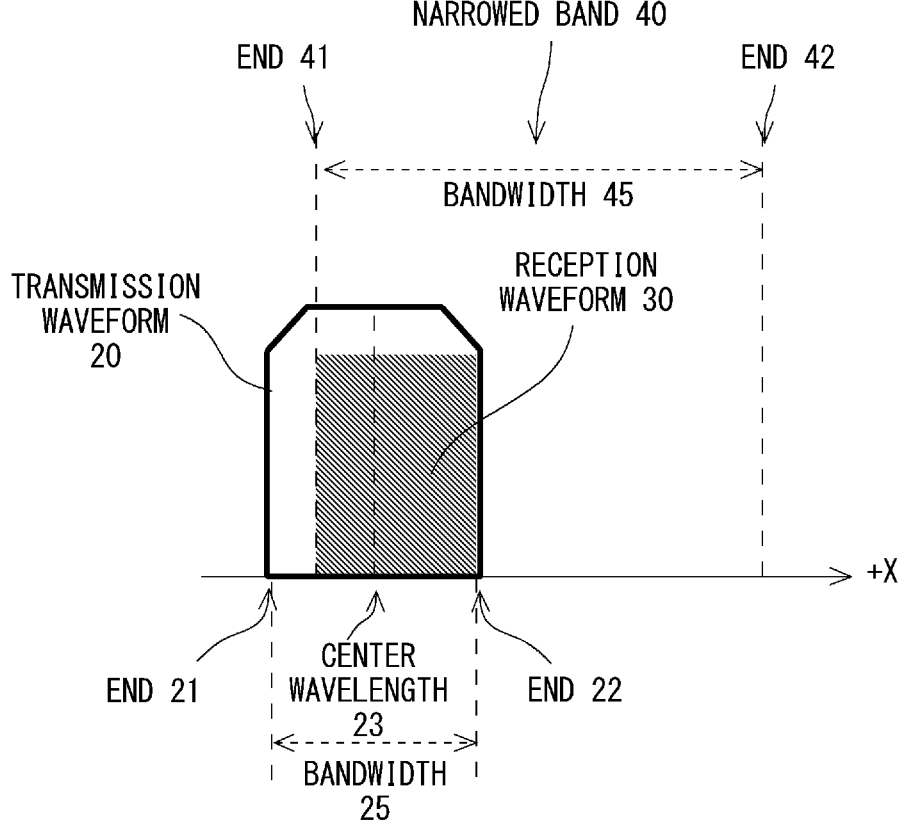
FIG. 4 shows an example of a transmission waveform of an optical signal transmitted by a transmitter-side optical communication apparatus according to an example embodiment as well as a narrowed bandwidth.

FIG. 4 shows an example of a transmission waveform of an optical signal transmitted by a transmitter-side optical communication apparatus NE1 according to an example embodiment as well as a narrowed bandwidth. As shown in FIG. 4, the optical signal transmitted from the transmitter-side optical communication apparatus NE1 has a transmission waveform 20. Herein, the higher wavelength side or the higher frequency side is denoted as the +X-axis direction. The end of the transmission waveform 20 in the −X-axis direction is referred to as an end 21, and the end of the transmission waveform 20 in the +X-axis direction is referred to as an end 22. The center wavelength of the transmission waveform 20 is referred to as a center wavelength 23. Herein, if the X-axis represents the frequency, the center wavelength 23 may be replaced with a center frequency. In the following as well, a center wavelength may be replaced with a center frequency. The transmission waveform 20 has a bandwidth 25.

The optical signal transmitted by the transmitter-side optical communication apparatus NE1 is inserted into WDM signal light, and the WDM signal light is transmitted through the optical communication network 100. The optical signal is then narrowed in the optical communication apparatus NE2 by a filter of a wavelength selective switch that selects an optical signal to be inserted into WDM signal light or an optical signal to be split from WDM signal light. The end, in the −X-axis direction, of a band 40 narrowed by the filter is referred to as an end 41, and the end of the band 40 in the +X-axis direction is referred to as an end 42. The bandwidth is referred to as a bandwidth 45.

In the plurality of optical communication apparatuses NE, the monitor unit MN of the optical communication apparatus NE2 monitors the bandwidths 45 narrowed by the filter of the wavelength selective switch. Thus, the monitor unit MN monitors, as a reception waveform 30, an optical signal in the narrowed bandwidth 45. Based on the monitored reception waveform 30, the center wavelength controlling unit CW feedback-controls the center wavelength 23 of the transmission waveform 20 of an optical signal that the other optical communication apparatus NE1 transmits.

For example, based on the center wavelength of the reception waveform 30 shown in FIG. 4, the center wavelength controlling unit CW performs feedback control so as to move, in the +X-axis direction, the center wavelength 23 of the transmission waveform 20 of an optical signal that the optical communication apparatus NE1 transmits. For example, the center wavelength controlling unit CW controls the center wavelength 23 of the transmission waveform 20 by controlling a wavelength-variable laser of the optical communication apparatus NE1. Thus, the monitor unit MN monitors the position of the filter's end 41 at which the transmission waveform 20 has been cut off.

The center wavelength controlling unit CW also moves the center wavelength 23 of the transmission waveform 20 in the +X-axis direction. Thus, the monitor unit MN monitors the position of the filter's end 42 at which the transmission waveform 20 has been cut off. In this manner, the monitor unit MN can acquire the shape of the filter based on the positions of the filter's end 41 and end 42 and align the center wavelength 23 of the transmission waveform 20 to the center of the narrowed bandwidth 45. Herein, the center wavelength controlling unit CW may feedback-control the center wavelength 23 of the transmission waveform 20 based on the shape including the bandwidth of the reception waveform 30.

[Optical Communication Method]

Figure 5:
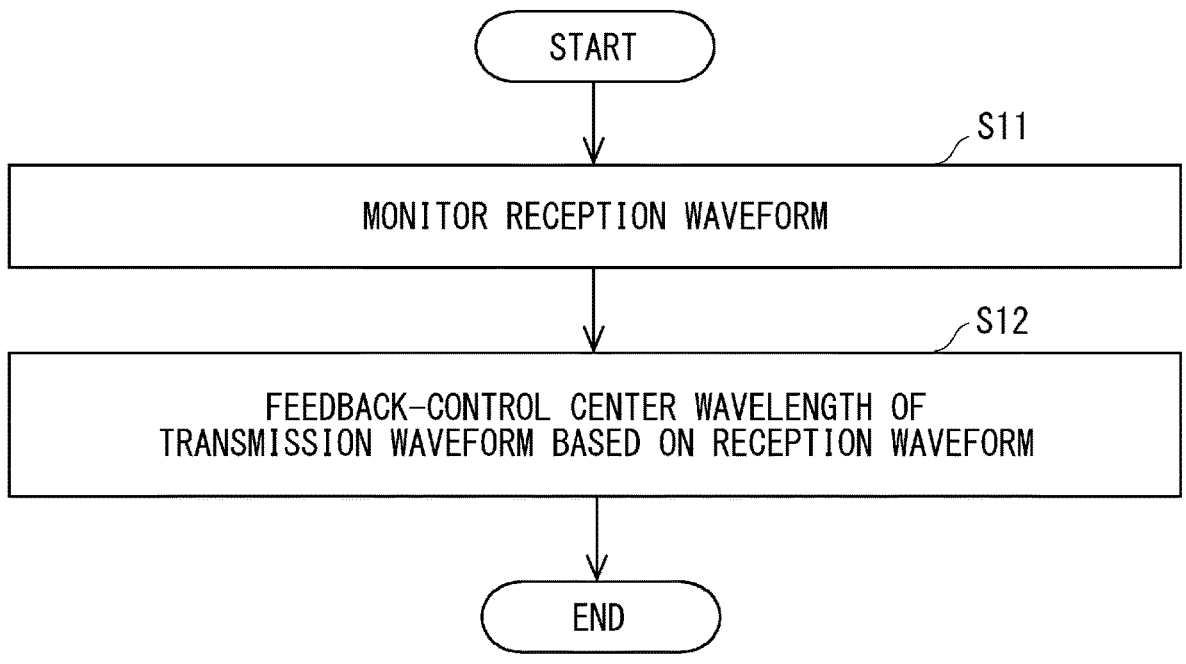
FIG. 5 is a flowchart showing an example of an optical communication method according to an example embodiment.

Next, an optical communication method will be described. FIG. 5 is a flowchart showing an example of an optical communication method according to an example embodiment. As indicated at step S11 of FIG. 5, a reception waveform 30 is monitored. Specifically, the monitor unit MN of the optical communication apparatus NE2, when an optical signal received from another optical communication apparatus NE1 is converted to a digital signal, monitors the reception waveform 30 of the optical signal.

Next, as indicated at step S12, a center wavelength 23 of a transmission waveform 20 is feedback-controlled based on the reception waveform 30. Specifically, based on the monitored reception waveform 30, the center wavelength controlling unit CW of the optical communication apparatus NE2 feedback-controls the center wavelength 23 of the transmission waveform 20 of an optical signal that the other optical communication apparatus NE1 transmits.

According to the present example embodiment, the center wavelength controlling unit CW feedback-controls the center wavelength 23 of the transmission waveform 20 based on the reception waveform 30 monitored by the monitor unit MN. Accordingly, each optical signal in WDM signal light has an appropriate center wavelength, and thus transmission characteristics can be improved.

[Another Optical Communication System]

Figure 6:
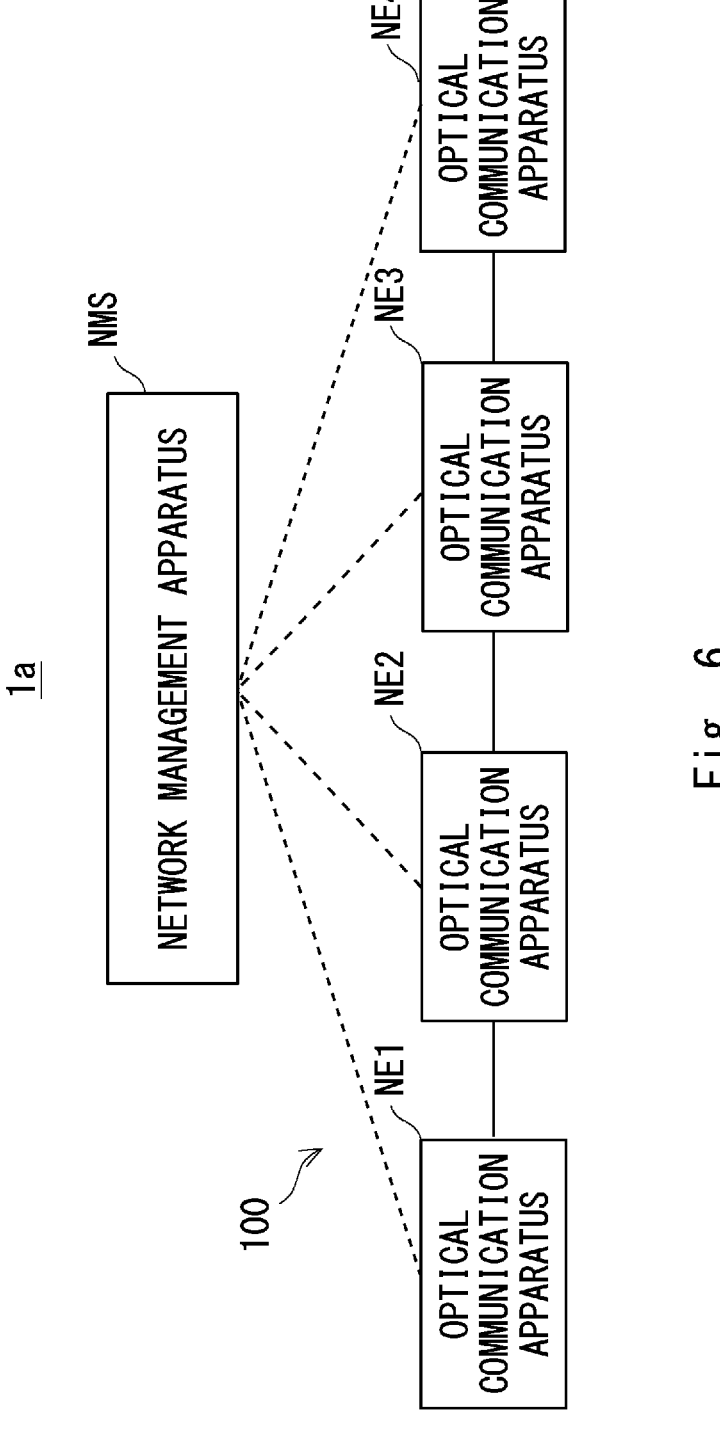
FIG. 6 is a configuration diagram showing an example of another optical communication system according to an example embodiment.

Next, another optical communication system will be described. FIG. 6 is a configuration diagram showing an example of another optical communication system according to an example embodiment. As shown in FIG. 6, an optical communication system 1a may include a network management apparatus NMS and an optical communication network 100. The figure shows four optical communication apparatuses NE1 to NE4. Each optical communication apparatus NE is connected to the network management apparatus NMS via a communication circuit, such as a LAN.

[Network Management Apparatus]

Figure 7:
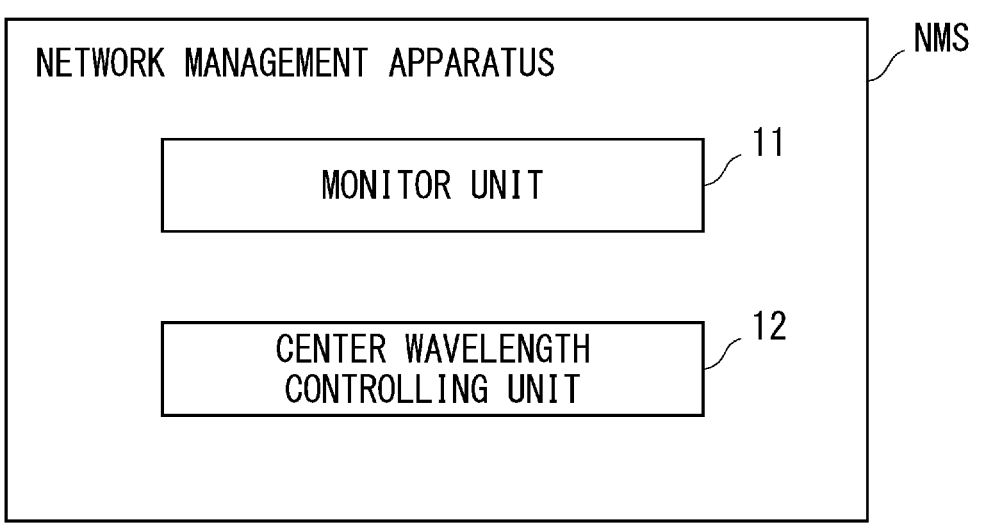
FIG. 7 is a block diagram showing an example of a network management apparatus in another optical communication system according to an example embodiment.

FIG. 7 is a block diagram showing an example of a network management apparatus NMS in another optical communication system according to an example embodiment. As shown in FIG. 7, the network management apparatus NMS includes a monitor unit 11 and a center wavelength controlling unit 12. The monitor unit 11 and the center wavelength controlling unit 12 have functions as, respectively, a monitor means and a center wavelength controlling means. In the case of the optical communication system 1a, each optical communication apparatus NE may or may not include a monitor unit MN and a center wavelength controlling unit CW.

The monitor unit 11 monitors a reception waveform 30 of an optical signal received by the optical communication apparatus NE. For example, the optical communication apparatus NE2 receives an optical signal transmitted by the optical communication apparatus NE1. When the optical communication apparatus NE2 converts the optical signal to a digital signal, the monitor unit 11 monitors the reception waveform 30 of the optical signal that the optical communication apparatus NE2 has received. In the plurality of optical communication apparatuses NE, the monitor unit 11 may monitor a bandwidth 45 narrowed by a filter that selects a wavelength of an optical signal. The monitor unit 11 may monitor a reception waveform 30 indicating a relationship of the optical intensity to the wavelength or frequency of the optical signal. Based on the monitored reception waveform 30, the center wavelength controlling unit 12 feedback-controls the center wavelength 23 of the transmission waveform 20 of an optical signal that the optical communication apparatus NE1 transmits.

In the other optical communication system 1a, the optical communication method shown in FIG. 5 may be performed with use of the network management apparatus NMS. For example, as indicated at step S11 of FIG. 5, when an optical signal received by the optical communication apparatus NE2 is converted to a digital signal, the monitor unit 11 of the network management apparatus NMS may monitor the reception waveform 30 of the received optical signal.

Next, as indicated at step S12, the center wavelength controlling unit 12 of the network management apparatus NMS may, based on the reception waveform 30 monitored in the optical communication apparatus NE2, feedback-control the center wavelength 23 of the transmission waveform 20 of an optical signal to be transmitted in the optical communication apparatus NE1 that has transmitted the optical signal.

According to the other optical communication system, the center wavelength controlling unit 12 feedback-controls the center wavelength 23 of the transmission waveform 20 based on the reception waveform 30 monitored by the monitor unit 11. Accordingly, each optical signal in WDM signal light has an appropriate center wavelength, and thus transmission characteristics can be improved.

First Example Embodiment

Next, details of an optical communication system according to a first example embodiment will be described. First, a configuration of an optical communication apparatus NE will be described. Then, an optical communication method will be described.

[Configuration of Optical Communication Apparatus]

Figure 8:
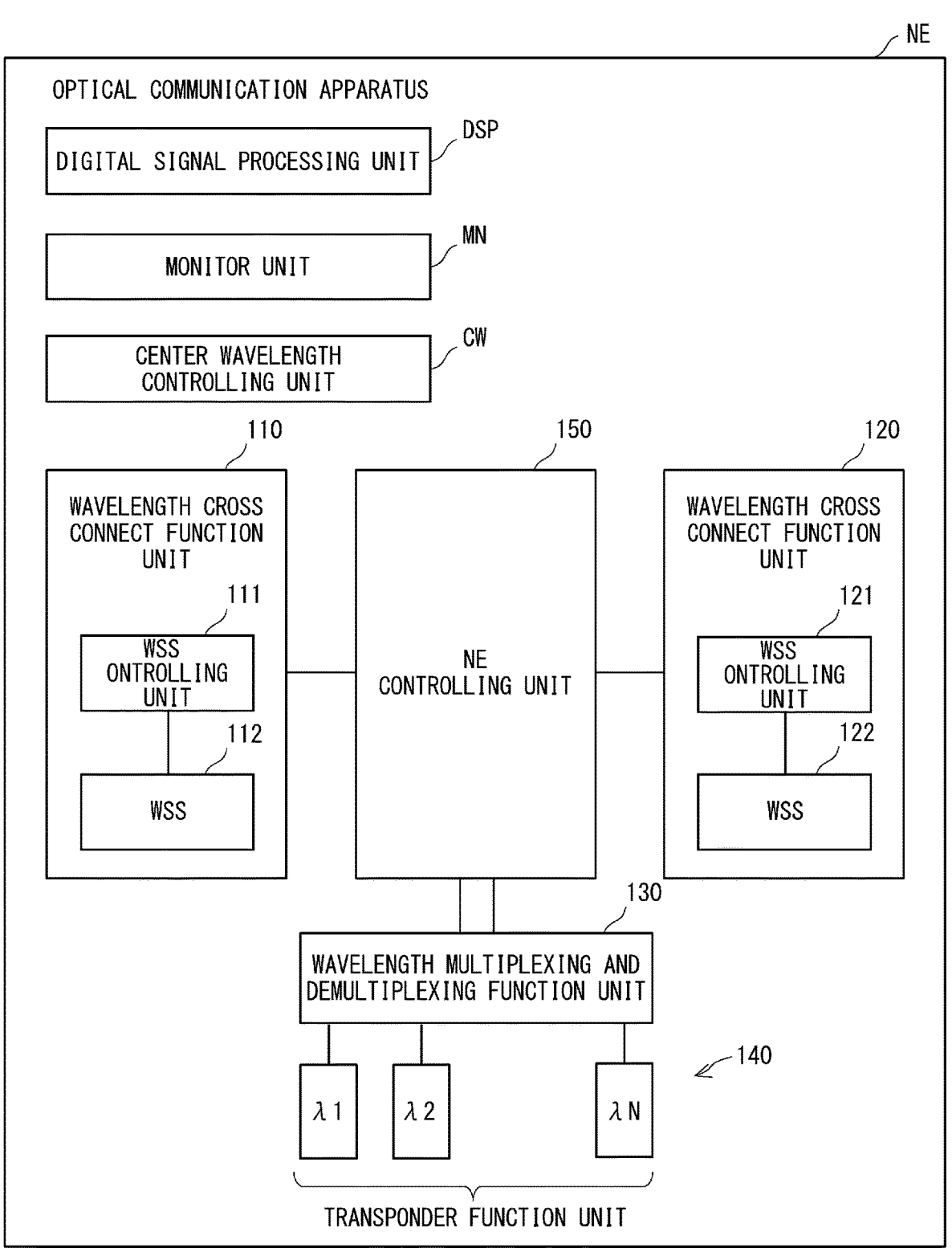
FIG. 8 is a block diagram showing an example of a configuration of an optical communication apparatus according to a first example embodiment.

FIG. 8 is a block diagram showing an example of a configuration of an optical communication apparatus NE according to a first example embodiment. As shown in FIG. 8, the optical communication apparatus NE includes, in addition to a digital signal processing unit DSP, a monitor unit MN, and a center wavelength controlling unit CW, a wavelength cross connect function unit 110, a wavelength cross connect function unit 120, a wavelength multiplexing and demultiplexing function unit 130, a transponder function unit 140, and an NE controlling unit 150.

The wavelength cross connect function unit 110 and the wavelength cross connect function unit 120 each have a function as a wavelength cross connect means. The wavelength multiplexing and demultiplexing function unit 130 and the transponder function unit 140 have functions as, respectively, a wavelength multiplexing and demultiplexing means and a transponder means. The NE controlling unit 150 has a function as a control means for the optical communication apparatus NE.

An amplifier may be connected to the wavelength cross connect function unit 110 and to the wavelength cross connect function unit 120. A transmitter and a receiver may be connected to the wavelength multiplexing and demultiplexing function unit 130 via the transponder function unit 140. The wavelength cross connect function unit 120 and the wavelength multiplexing and demultiplexing function unit 130 may constitute a multiplexing device. The wavelength cross connect function unit 110 and the wavelength multiplexing and demultiplexing function unit 130 may constitute a demultiplexing device. The wavelength cross connect function unit 110 and the wavelength cross connect function unit 120 may constitute a relay device. Herein, a relay device may be constituted by an amplifier, instead of having the wavelength cross connect function unit 110 and the wavelength cross connect function unit 120.

The wavelength cross connect function unit 110 demultiplexer a predetermined optical signal from received WDM signal light. Specifically, the wavelength cross connect function unit 110 selects a wavelength band to split an optical signal and switches the wavelength band. The wavelength cross connect function unit 110 includes a WSS controlling unit 111 and a wavelength selective switch 112. The WSS controlling unit 111 has a function as a control means that controls the operation of the wavelength selective switch 112. The wavelength selective switch 112 has a function as a switch means that selects a predetermined wavelength.

The wavelength cross connect function unit 120 multiplexes a predetermined optical signal into WDM signal light. Specifically, the wavelength cross connect function unit 120 selects a wavelength band to insert an optical signal and switches the wavelength band. The wavelength cross connect function unit 120 includes a WSS controlling unit 121 and a wavelength selective switch 122. The WSS controlling unit 121 has a function as a control means that controls the operation of the wavelength selective switch 122. The wavelength selective switch 122 has a function as a switch means that selects a predetermined wavelength.

The wavelength multiplexing and demultiplexing function unit 130 and the transponder function unit 140 transmit an optical signal demultiplexed by the wavelength cross connect function unit 110 to a receiver. Specifically, the wavelength multiplexing and demultiplexing function unit 130 and the transponder function unit 140 receive an optical signal to be split from a wavelength band. The wavelength multiplexing and demultiplexing function unit 130 and the transponder function unit 140 multiplex the optical signal transmitted from the transmitter and transmits the optical signal to the wavelength cross connect function unit 120. Specifically, the wavelength multiplexing and demultiplexing function unit 130 and the transponder function unit 140 transmit an optical signal to be inserted to a wavelength band.

The NE controlling unit 150 controls the operations of the wavelength cross connect function unit 110, the wavelength cross connect function unit 120, the wavelength multiplexing and demultiplexing function unit 130, and the transponder function unit 140.

[Optical Communication Method]

Next, an optical communication method will be described as an operation of an optical communication apparatus NE. The optical communication method will be described with respect to the following three cases: a case in which a bandwidth 25 of a transmission waveform 20 is greater than a narrowed bandwidth 45 (bandwidth of transmission waveform>narrowed bandwidth), a case in which a bandwidth 25 of a transmission waveform 20 is smaller than a narrowed bandwidth 45 (bandwidth of transmission waveform<narrowed bandwidth), and a case in which a bandwidth 25 of a transmission waveform 20 is overwhelmingly smaller than a narrowed bandwidth 45 (bandwidth of transmission waveform<<narrowed bandwidth).

[Bandwidth of Transmission Waveform>Narrowed Bandwidth]

Figure 9:
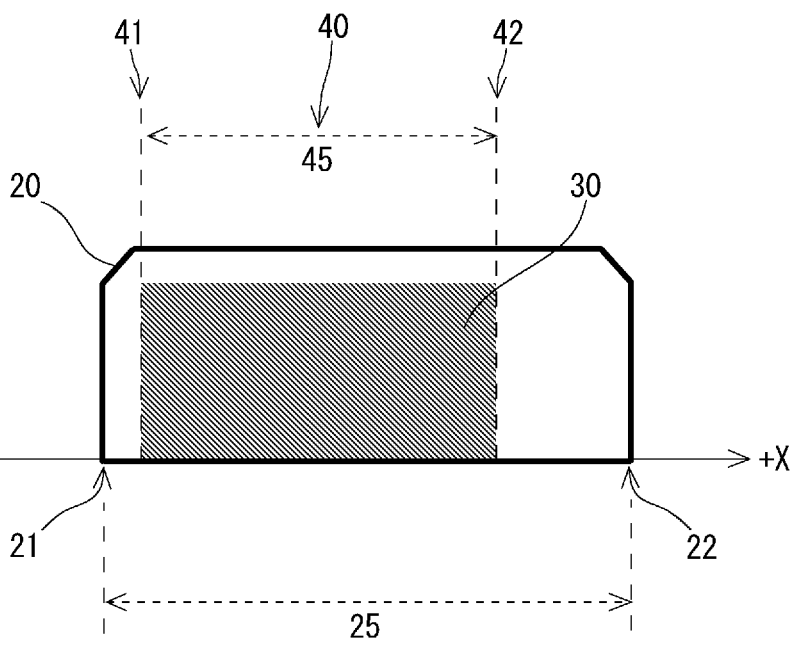
FIG. 9 shows an example of a transmission waveform of an optical signal transmitted by a transmitter-side optical communication apparatus according to the first example embodiment as well as a narrowed bandwidth, and shows a transmission waveform that has not been adjusted by a center wavelength controlling unit.
Figure 10:
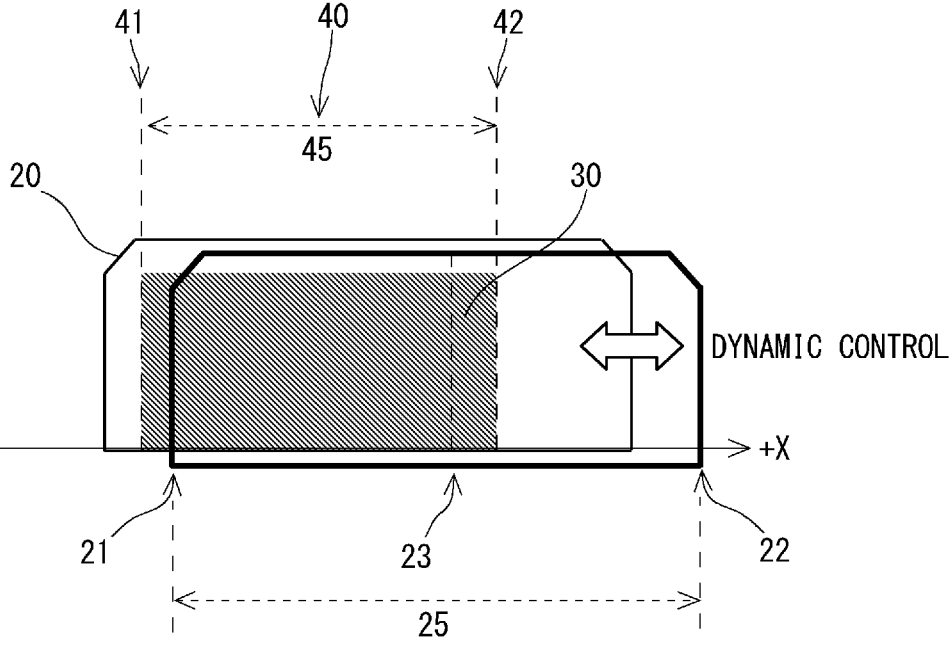
FIG. 10 shows an example of a transmission waveform of an optical signal transmitted by a transmitter-side optical communication apparatus according to the first example embodiment as well as a narrowed bandwidth, and shows a transmission waveform that is being adjusted by a center wavelength controlling unit.
Figure 11:
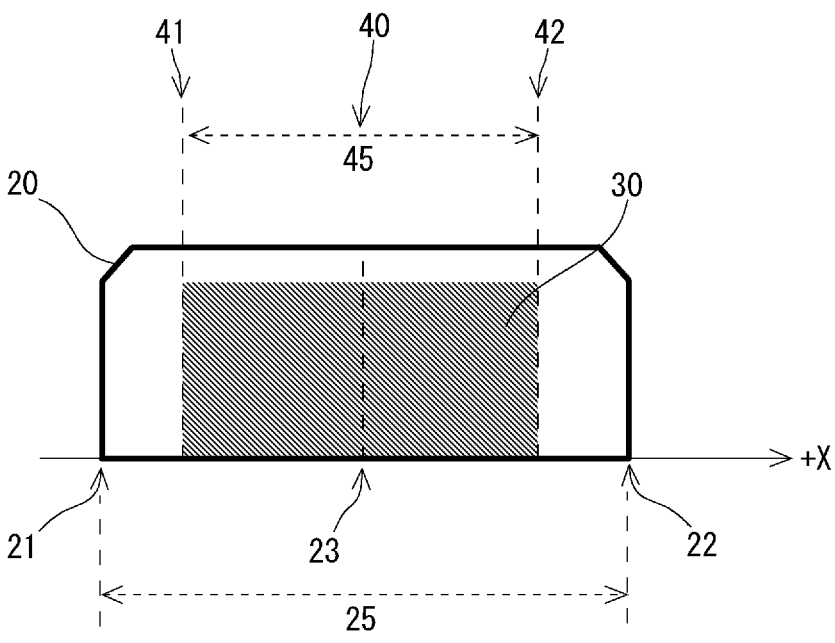
FIG. 11 shows an example of a transmission waveform of an optical signal transmitted by a transmitter-side optical communication apparatus according to the first example embodiment as well as a narrowed bandwidth, and shows a transmission waveform that has been adjusted by a center wavelength controlling unit.

FIGS. 9 to 11 show examples of a transmission waveform 20 of an optical signal transmitted by a transmitter-side optical communication apparatus NE according to the first example embodiment as well as a narrowed bandwidth 45. FIG. 9 shows the transmission waveform 20 that has not been adjusted by the center wavelength controlling unit CW, FIG. 10 shows the transmission waveform that is being adjusted by the center wavelength controlling unit CW, and FIG. 11 shows the transmission waveform 20 that has been adjusted by the center wavelength controlling unit CW.

As shown in FIG. 9, the bandwidth 25 of the transmission waveform 20 is greater than the narrowed bandwidth 45. The end 21 and end 22 of the transmission waveform 20 are located outside the range of the narrowed bandwidth 45. Therefore, the monitor unit MN monitors the reception waveform through the narrowed bandwidth 45. Furthermore, the monitor unit MN can monitor the positions of the end 41 and end 42 of the bandwidth 45 narrowed by the filter. Thus, the monitor unit MN can monitor the center position of the bandwidth 45.

As shown in FIG. 10, the center wavelength controlling unit CW feedback-controls the transmission waveform 20 based on the reception waveform 30. For example, the center wavelength controlling unit CW moves the transmission waveform 20 in the +X-axis direction by dynamically controlling the transmission waveform 20. Then, the end 21 of the transmission waveform 20 moves into the range of the narrowed bandwidth 45. Thus, the monitor unit MN can monitor the end 21 of the transmission waveform 20.

The center wavelength controlling unit CW also moves the transmission waveform 20 in the −X-axis direction by dynamically controlling the transmission waveform 20. Then, the end 22 of the transmission waveform 20 moves into the range of the narrowed bandwidth 45. Thus, the monitor unit MN can monitor the end 22 of the transmission waveform 20. This makes it possible to monitor the end 21 and end 22 of the transmission waveform 20. Thus, the monitor unit MN can monitor the bandwidth 25 of the transmission waveform 20 as well as the center wavelength 23. Accordingly, as shown in FIG. 11, the center wavelength controlling unit CW can position the center wavelength 23 of the transmission waveform 20 at the center of the narrowed bandwidth 45.

[Bandwidth of Transmission Waveform<Narrowed Bandwidth]

Figure 12:
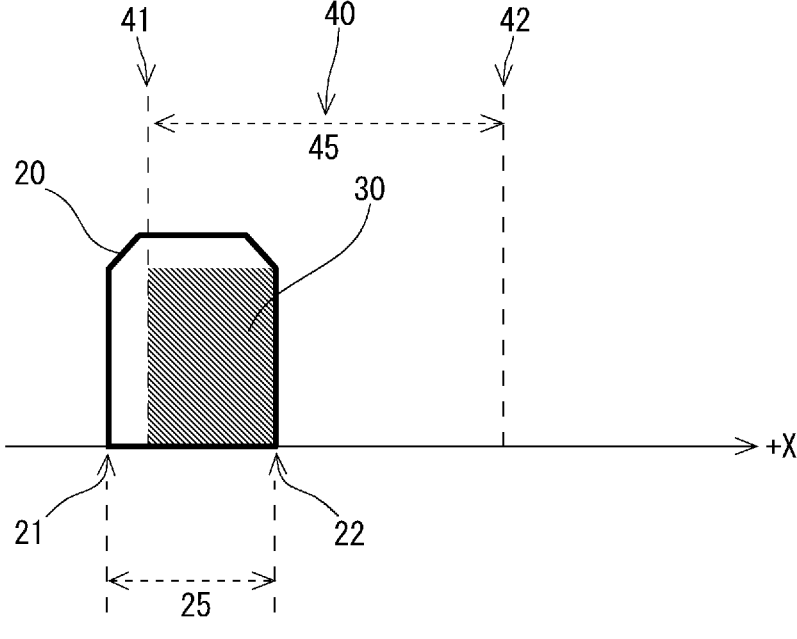
FIG. 12 shows an example of a transmission waveform of an optical signal transmitted by a transmitter-side optical communication apparatus according to the first example embodiment as well as a narrowed bandwidth, and shows a transmission waveform that has not been adjusted by a center wavelength controlling unit.
Figure 13:
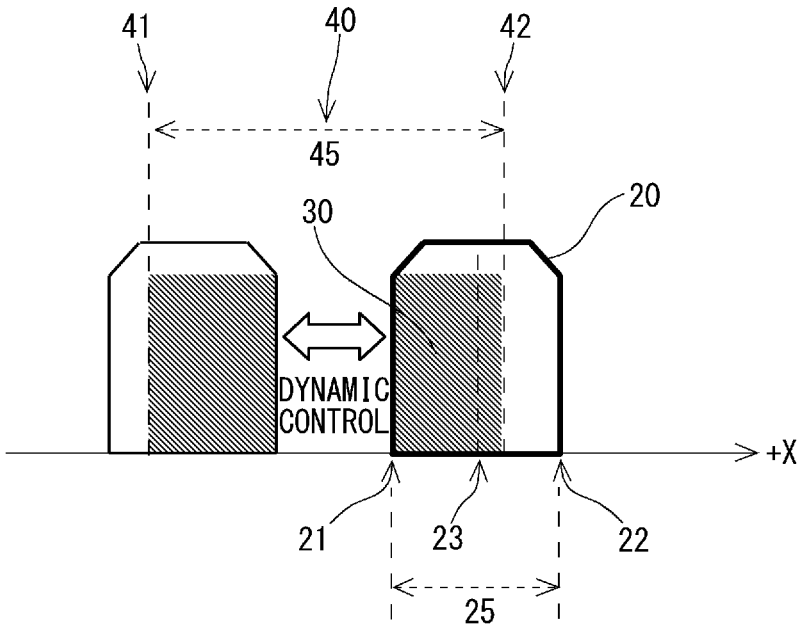
FIG. 13 shows an example of a transmission waveform of an optical signal transmitted by a transmitter-side optical communication apparatus according to the first example embodiment as well as a narrowed bandwidth, and shows a transmission waveform that is being adjusted by a center wavelength controlling unit.
Figure 14:
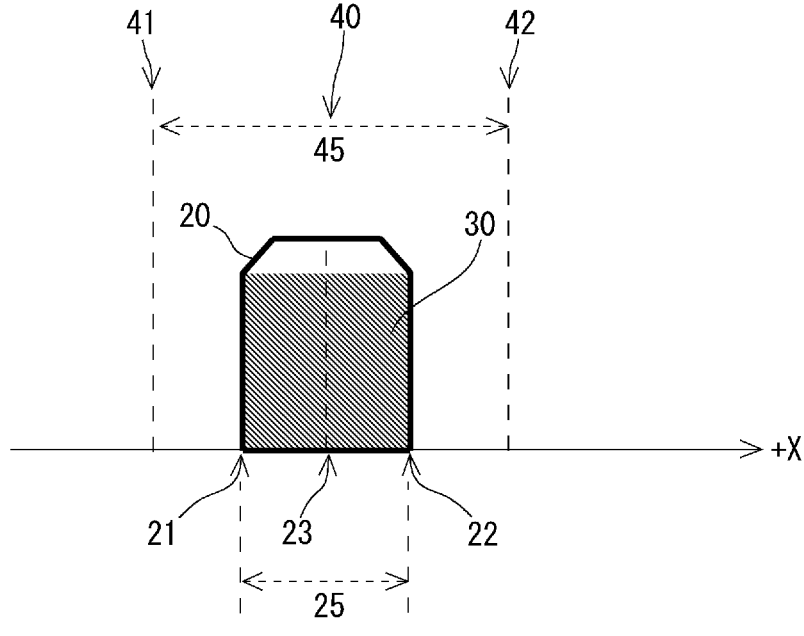
FIG. 14 shows an example of a transmission waveform of an optical signal transmitted by a transmitter-side optical communication apparatus according to the first example embodiment as well as a narrowed bandwidth, and shows a transmission waveform that has been adjusted by a center wavelength controlling unit.

FIGS. 12 to 14 show examples of a transmission waveform 20 of an optical signal transmitted by a transmitter-side optical communication apparatus NE according to the first example embodiment as well as a narrowed bandwidth 45. FIG. 12 shows the transmission waveform 20 that has not been adjusted by the center wavelength controlling unit CW, FIG. 13 shows the transmission waveform 20 that is being adjusted by the center wavelength controlling unit CW, and FIG. 14 shows the transmission waveform 20 that has been adjusted by the center wavelength controlling unit CW.

As shown in FIG. 12, the bandwidth 25 of the transmission waveform 20 is smaller than the narrowed bandwidth 45. The end 21 of the transmission waveform 20 is located outside the range of the narrowed bandwidth 45. Meanwhile, the end 22 of the transmission waveform 20 is located within the range of the narrowed bandwidth 45. Thus, the monitor unit MN can monitor the end 22 of the transmission waveform 20. The monitor unit MN also monitors the reception waveform 30 on the side of the narrowed bandwidth 45 in the −X-axis direction. Thus, the monitor unit MN can monitor the position of the end 41 of the bandwidth 45 narrowed by the filter.

As shown in FIG. 13, the center wavelength controlling unit CW feedback-controls the transmission waveform 20 based on the reception waveform 30. For example, the center wavelength controlling unit CW moves the transmission waveform 20 in the +X-axis direction by dynamically controlling the transmission waveform 20. Then, the end 21 of the transmission waveform 20 moves into the range of the narrowed bandwidth 45. Thus, the monitor unit MN can monitor the end 21 of the transmission waveform 20. Hence, the monitor unit MN can monitor the bandwidth 25 of the transmission waveform 20 as well as the center wavelength 23 of the transmission waveform 20. The monitor unit MN also monitors the reception waveform 30 on the side of the narrowed bandwidth 45 in the +X-axis direction. Thus, the monitor unit MN can monitor the position of the end 42 of the bandwidth 45 narrowed by the filter. Hence, the monitor unit MN can monitor the center position of the bandwidth 45.

In this manner, as shown in FIG. 14, the center wavelength controlling unit CW can position the center wavelength 23 of the transmission waveform 20 at the center of the narrowed bandwidth 45.

[Bandwidth of Transmission Waveform<<Narrowed Bandwidth]

Figure 15:
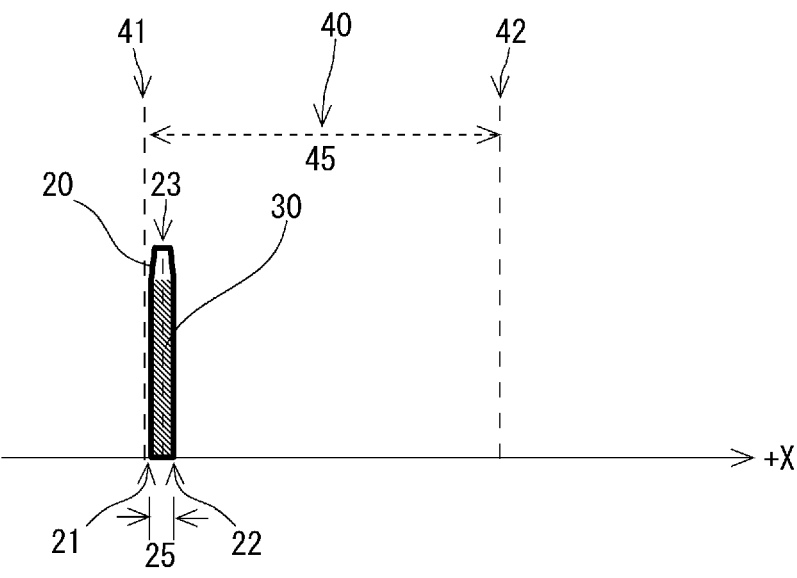
FIG. 15 shows an example of a transmission waveform of an optical signal transmitted by a transmitter-side optical communication apparatus according to the first example embodiment as well as a narrowed bandwidth, and shows a transmission waveform that has not been adjusted by a center wavelength controlling unit.
Figure 16:
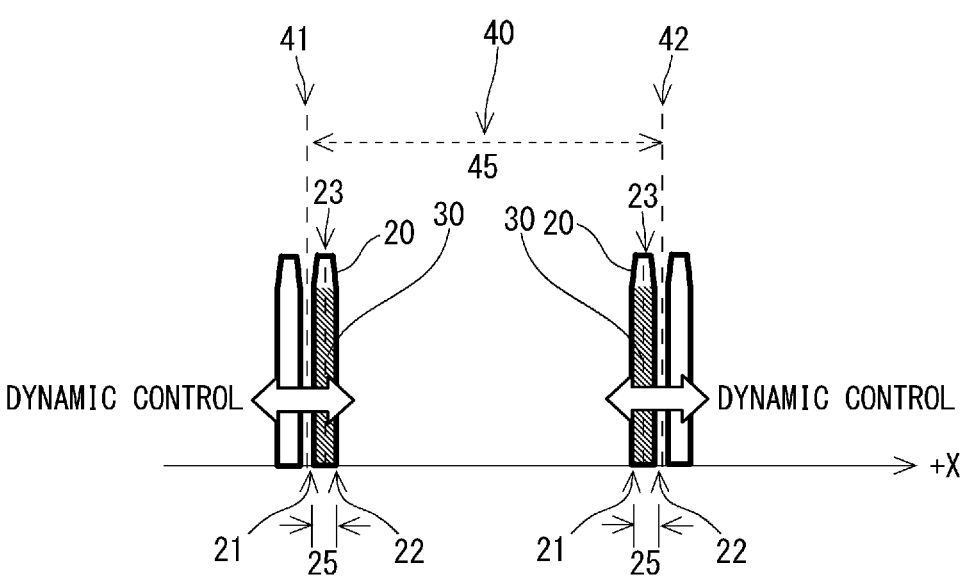
FIG. 16 shows an example of a transmission waveform of an optical signal transmitted by a transmitter-side optical communication apparatus according to the first example embodiment as well as a narrowed bandwidth, and shows a transmission waveform that is being adjusted by a center wavelength controlling unit.
Figure 17:
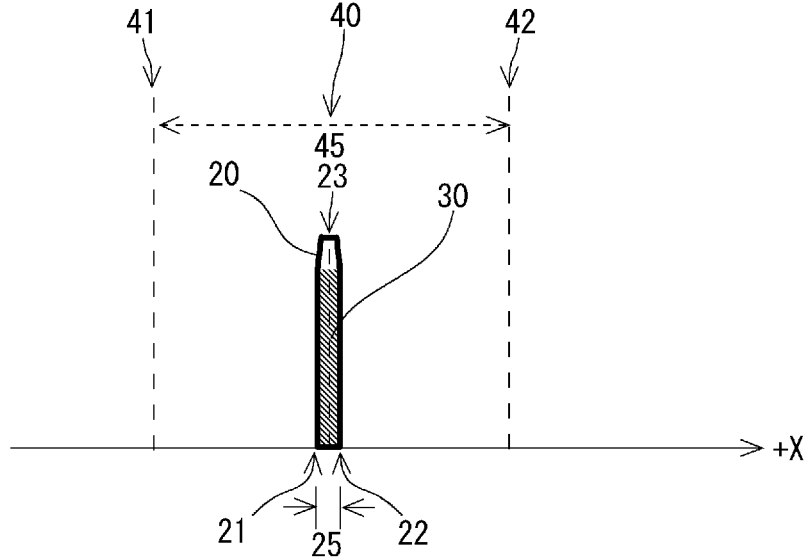
FIG. 17 shows an example of a transmission waveform of an optical signal transmitted by a transmitter-side optical communication apparatus according to the first example embodiment as well as a narrowed bandwidth, and shows a transmission waveform that has been adjusted by a center wavelength controlling unit.

FIGS. 15 to 17 show examples of a transmission waveform 20 of an optical signal transmitted by a transmitter-side optical communication apparatus NE according to the first example embodiment as well as a narrowed bandwidth 45. FIG. 15 shows the transmission waveform 20 that has not been adjusted by the center wavelength controlling unit CW, FIG. 16 shows the transmission waveform 20 that is being adjusted by the center wavelength controlling unit CW, and FIG. 17 shows the transmission waveform 20 that has been adjusted by the center wavelength controlling unit CW.

As shown in FIG. 15, the bandwidth 25 of the transmission waveform 20 is overwhelmingly smaller than the narrowed bandwidth 45. The end 21 and end 22 of the transmission waveform 20 are located within the range of the narrowed bandwidth 45. Thus, the monitor unit MN can monitor the end 21 and end 22 of the transmission waveform 20. Hence, the monitor unit MN can monitor the bandwidth 25 of the transmission waveform 20 as well as the center wavelength 23 of the transmission waveform 20. The monitor unit MN can also monitor the reception waveform 30.

As shown in FIG. 16, the center wavelength controlling unit CW feedback-controls the transmission waveform 20 based on the reception waveform 30. For example, the center wavelength controlling unit CW moves the transmission waveform 20 to the side of the end 41 in the −X-axis direction by dynamically controlling the transmission waveform 20. Then, the transmission waveform 20 moves out of the range of the narrowed bandwidth 45. Thus, the monitor unit MN can monitor the position of the end 41 of the bandwidth 45 narrowed by the filter.

The center wavelength controlling unit CW moves the transmission waveform 20 to the side of the end 42 in the +X-axis direction by dynamically controlling the transmission waveform 20. Then, the transmission waveform 20 moves out of the range of the narrowed bandwidth 45. Thus, the monitor unit MN can monitor the position of the end 42 of the bandwidth 45 narrowed by the filter. Hence, the monitor unit MN can monitor the center position of the bandwidth 45.

In this manner, as shown in FIG. 17, the center wavelength controlling unit CW can position the center wavelength 23 of the transmission waveform 20 at the center of the narrowed bandwidth 45.

For example, the monitor unit MN may monitor the reception waveform of a main optical signal transmitted or received while the optical communication network 100 is in operation, or monitor the reception waveform of a training optical signal transmitted or received while the optical communication network 100 is adjusted.

For a main optical signal, a transmission waveform 20 that yields "bandwidth 25 of transmission waveform 20>narrowed bandwidth 45" may be used. Meanwhile, for a training optical signal, a transmission waveform 20 that yields "bandwidth 25 of transmission waveform 20<narrowed bandwidth 45" or "bandwidth 25 of transmission waveform 20<<narrowed bandwidth 45" may be used. Reducing the bandwidth 25 of a training optical signal to smaller than the narrowed bandwidth 45 can reduce an influence between adjacent optical signals. Furthermore, that can reduce the wavelength range in which the center wavelength controlling unit CW dynamically controls the transmission waveform 20, which makes it easier to locate the end 41 and end 42 of the narrowed bandwidth 45. Accordingly, the adjustment can be facilitated.

For a main optical signal, a transmission waveform 20 that yields "bandwidth 25 of transmission waveform 20<narrowed bandwidth 45" or "bandwidth 25 of transmission waveform 20<<narrowed bandwidth 45" may be used. This can increase the transmission capacity.

Second Example Embodiment

Next, an optical communication system according to a second example embodiment will be described. According to the present example embodiment, a reception waveform 30 is monitored, and an adjustment timing of feedback-controlling a transmission waveform 20 is changed.

For example, the transmission waveform 20 may be adjusted when a new optical communication apparatus NE is connected to the optical communication network 100. Specifically, when a new optical communication apparatus NE is connected, a training optical signal may be transmitted or received. Then, the new optical communication apparatus NE may be caused to monitor the reception waveform 30 and to feedback-control the center wavelength 23 of the transmitter-side transmission waveform 20 based on the reception waveform 30. Thus, the transmission characteristics of the newly established optical communication apparatus NE can be improved.

Furthermore, for example, the transmission waveform 20 may be adjusted to correct a change over time of the optical communication network 100. Specifically, a training optical signal may be transmitted or received when the optical communication network 100 is inspected at each predetermined period. Then, each optical communication apparatus NE may be caused to monitor the reception waveform 30 and to feedback-control the center wavelength 23 of the transmitter-side transmission waveform 20. This can reduce an influence of a change over time of the optical communication network 100.

In the optical communication network 100, for example, when the path from the optical communication apparatus NE1 to the optical communication apparatus NE2 is changed, the transmission waveform 20 may be adjusted. Specifically, when the path from the optical communication apparatus NE1 to the optical communication apparatus NE2 is changed, a training optical signal may be transmitted or received. Then, the optical communication apparatus NE2 may be caused to monitor the reception waveform 30 and to feedback-control the center wavelength 23 of the transmitter-side transmission waveform 20. This can improve the transmission characteristics of the changed path.

Thus far, the invention of the present application has been described with reference to the overview of an example embodiment and the first and second example embodiments, but the overview of an example embodiment and the first and second example embodiments described above do not limit the invention of the present application. Various modifications that a person skilled in the art can appreciate can be made to the configurations and the details of the invention of the present application within the scope of the invention of the present application. For example, an example embodiment obtained by combining the components of the overview of an example embodiment and the first and second example embodiments is also encompassed by the technical scope and spirit.

Part or the whole of the foregoing example embodiments can also be expressed as in the following supplementary notes, which are not limiting.

(Supplementary Note 1)

An optical communication method comprising:

a step of, when an optical communication apparatus connected to an optical communication network converts an optical signal received from an other optical communication apparatus to a digital signal, monitoring a reception waveform of the optical signal, the optical communication network including a plurality of optical communication apparatuses connected via a transmission line that transmits WDM signal light in which a plurality of optical signals are wavelength-division multiplexed; and a step of, based on the monitored reception waveform, feedback-controlling a center wavelength of a transmission waveform of the optical signal that the other optical communication apparatus transmits.

(Supplementary Note 2)

The optical communication method according to Supplementary Note 1, wherein, in the step of monitoring, a bandwidth narrowed by a filter that selects a wavelength of the optical signal to be inserted into the WDM signal light or a wavelength of the optical signal to be split from the WDM signal light is monitored in the plurality of optical communication apparatuses.

(Supplementary Note 3)

The optical communication method according to Supplementary Note 1 or 2, wherein, in the step of monitoring, a bandwidth of the transmission waveform is monitored.

(Supplementary Note 4)

The optical communication method according to any one of Supplementary Notes 1 to 3, wherein, in the step of monitoring, a reception waveform indicating a relationship of an optical intensity to a wavelength or frequency of the optical signal is monitored.

(Supplementary Note 5)

The optical communication method according to any one of Supplementary Notes 1 to 4, wherein, in the step of monitoring, the reception waveform of a main optical signal transmitted or received while the optical communication network is in operation and the reception waveform of a training optical signal transmitted or received when the optical communication network is adjusted are monitored.

(Supplementary Note 6)

The optical communication method according to Supplementary Note 5, wherein a bandwidth of the training optical signal is set smaller than a bandwidth narrowed by a filter that selects a wavelength of the optical signal to be inserted into the WDM signal light or a wavelength of the optical signal to be split from the WDM signal light.

(Supplementary Note 7)

The optical communication method according to Supplementary Note 5 or 6, wherein the training optical signal is transmitted or received in at least one of a case in which a new optical communication apparatus is connected to the optical communication network, a case in which the optical communication network is inspected at each predetermined period, or a case in which a path in the optical communication network is changed.

(Supplementary Note 8)

An optical communication system comprising:

an optical communication network including a plurality of optical communication apparatuses connected via a transmission line that transmits WDM signal light in which a plurality of optical signals are wavelength-division multiplexed, wherein the optical communication apparatus includes a monitor unit configured to, when an optical signal received from an other optical communication apparatus is converted to a digital signal, monitor a reception waveform of the optical signal, and a center wavelength controlling unit configured to, based on the monitored reception waveform, feedback-control a center wavelength of a transmission waveform of the optical signal that the other optical communication apparatus transmits.

(Supplementary Note 9)

The optical communication system according to Supplementary Note 8, wherein the monitor unit is configured to monitor, in the plurality of optical communication apparatuses, a bandwidth narrowed by a filter that selects a wavelength of the optical signal to be inserted into the WDM signal light or a wavelength of the optical signal to be split from the WDM signal light.

(Supplementary Note 10)

The optical communication system according to Supplementary Note 8 or 9, wherein the monitor unit is configured to monitor a bandwidth of the transmission waveform.

(Supplementary Note 11)

The optical communication system according to any one of Supplementary Notes 8 to 10, wherein the monitor unit is configured to monitor a reception waveform indicating a relationship of an optical intensity to a wavelength or frequency of the optical signal.

(Supplementary Note 12)

The optical communication system according to any one of Supplementary Notes 8 to 11, wherein the monitor unit is configured to monitor the reception waveform of a main optical signal transmitted or received while the optical communication network is in operation and the reception waveform of a training optical signal transmitted or received when the optical communication network is adjusted.

(Supplementary Note 13)

The optical communication system according to Supplementary Note 12, wherein a bandwidth of the training optical signal is set smaller than a bandwidth narrowed by a filter that selects a wavelength of the optical signal to be inserted into the WDM signal light or a wavelength of the optical signal to be split from the WDM signal light.

(Supplementary Note 14)

The optical communication system according to Supplementary Note 12 or 13, wherein the training optical signal is transmitted or received in at least one of a case in which a new optical communication apparatus is connected to the optical communication network, a case in which the optical communication network is inspected at each predetermined period, or a case in which a path in the optical communication network is changed.

(Supplementary Note 15)

An optical communication system comprising:

an optical communication network including a plurality of optical communication apparatuses connected via a transmission line that transmits WDM signal light in which a plurality of optical signals are wavelength-division multiplexed; and a network management apparatus configured to manage the optical communication network, wherein the network management apparatus includes a monitor unit configured to, when a second optical communication apparatus that has received an optical signal transmitted by a first optical communication apparatus converts the optical signal to a digital signal, monitor a reception waveform of the optical signal, and a center wavelength controlling unit configured to, based on the monitored reception waveform, feedback-control a center wavelength of a transmission waveform of the optical signal that the first optical communication apparatus transmits.

(Supplementary Note 16)

The optical communication system according to Supplementary Note 15, wherein the monitor unit is configured to monitor, in the plurality of optical communication apparatuses, a bandwidth narrowed by a filter that selects a wavelength of the optical signal to be inserted into the WDM signal light or a wavelength of the optical signal to be split from the WDM signal light.

(Supplementary Note 17)

The optical communication system according to Supplementary Note 15 or 16, wherein the monitor unit is configured to monitor a bandwidth of the transmission waveform.

(Supplementary Note 18)

The optical communication system according to any one of Supplementary Notes 15 to 17, wherein the monitor unit is configured to monitor a reception waveform indicating a relationship of an optical intensity to a wavelength or frequency of the optical signal.

(Supplementary Note 19)

The optical communication system according to any one of Supplementary Notes 15 to 18, wherein the monitor unit is configured to monitor the reception waveform of a main optical signal transmitted or received while the optical communication network is in operation and the reception waveform of a training optical signal transmitted or received when the optical communication network is adjusted.

(Supplementary Note 20)

The optical communication system according to Supplementary Note 19, wherein a bandwidth of the training optical signal is set smaller than a bandwidth narrowed by a filter that selects a wavelength of the optical signal to be inserted into the WDM signal light or a wavelength of the optical signal to be split from the WDM signal light.

(Supplementary Note 21)

The optical communication system according to Supplementary Note 19 or 20, wherein the training optical signal is transmitted or received in at least one of a case in which a new optical communication apparatus is connected to the optical communication network, a case in which the optical communication network is inspected at each predetermined period, or a case in which a path in the optical communication network is changed.

This application claims priority to Japanese Patent Application No. 2021-050738, filed on Mar. 24, 2021, the entire disclosure of which is incorporated herein.

REFERENCE SIGNS LIST 1, 1a OPTICAL COMMUNICATION SYSTEM
11 MONITOR UNIT
12 CENTER WAVELENGTH CONTROLLING UNIT
20 TRANSMISSION WAVEFORM
21, 22 END

23 CENTER WAVELENGTH
25 BANDWIDTH
30 RECEPTION WAVEFORM
40 NARROWED BAND
41 END
42 END
45 BANDWIDTH
100 OPTICAL COMMUNICATION NETWORK
CW CENTER WAVELENGTH CONTROLLING UNIT
DSP DIGITAL SIGNAL PROCESSING UNIT
MN MONITOR UNIT
NE, NE1, NE2, NE3, NE4 OPTICAL COMMUNICATION APPARATUS
NMS NETWORK MANAGEMENT APPARATUS

What is claimed is:

1. An optical communication apparatus comprising:

monitor unit configured to, when the optical communication apparatus connects to an optical communication network and converts an optical signal received from another optical communication apparatus to a digital signal, monitor a reception waveform of the optical signal, the optical communication network including a plurality of optical communication apparatuses connected via a transmission line that transmits a WDM signal light in which a plurality of optical signals are wavelength-division multiplexed; and center wavelength controlling unit configured to, based on the monitored reception waveform, feedback-control a center wavelength of a transmission waveform of the optical signal that the other optical communication apparatus transmits, wherein the monitor unit is configured to monitor the reception waveform of a main optical signal transmitted or received while the optical communication network is in operation and the reception waveform of a training optical signal transmitted or received when the optical communication network is adjusted, and wherein a bandwidth of the training optical signal is set smaller than a bandwidth narrowed by a filter that selects a wavelength of the optical signal to be inserted into the WDM signal light or a wavelength of the optical signal to be split from the WDM signal light.

2. The optical communication apparatus according to claim 1, wherein the monitor unit is configured to monitor, in the plurality of optical communication apparatuses, a bandwidth narrowed by a filter that selects a wavelength of the optical signal to be inserted into the WDM signal light or a wavelength of the optical signal to be split from the WDM signal light.

3. The optical communication apparatus according to claim 1, wherein the monitor unit is configured to monitor a bandwidth of the transmission waveform.

4. The optical communication apparatus according to claim 1, wherein the monitor unit is configured to monitor a reception waveform indicating a relationship of an optical intensity to a wavelength or frequency of the optical signal.

5. The optical communication apparatus according to claim 1, wherein the training optical signal is transmitted or received in at least one of a case in which a new optical communication apparatus is connected to the optical communication network, a case in which the optical communication network is inspected at each predetermined period, or a case in which a path in the optical communication network is changed.

6. An optical communication system comprising:

an optical communication network including a plurality of optical communication apparatuses connected via a transmission line that transmits a WDM signal light in which a plurality of optical signals are wavelength-division multiplexed, wherein the optical communication apparatus includes monitor unit configured to, when an optical signal received from another optical communication apparatus is converted to a digital signal, monitor a reception waveform of the optical signal, and center wavelength controlling unit configured to, based on the monitored reception waveform, feedback-control a center wavelength of a transmission waveform of the optical signal that the other optical communication apparatus transmits, wherein the monitor unit is configured to monitor the reception waveform of a main optical signal transmitted or received while the optical communication network is in operation and the reception waveform of a training optical signal transmitted or received when the optical communication network is adjusted, and wherein a bandwidth of the training optical signal is set smaller than a bandwidth narrowed by a filter that selects a wavelength of the optical signal to be inserted into the WDM signal light or a wavelength of the optical signal to be split from the WDM signal light.

7. The optical communication system according to claim 6, wherein the monitor unit is configured to monitor, in the plurality of optical communication apparatuses, a bandwidth narrowed by a filter that selects a wavelength of the optical signal to be inserted into the WDM signal light or a wavelength of the optical signal to be split from the WDM signal light.

8. The optical communication system according to claim 6, wherein the monitor-unit is configured to monitor a bandwidth of the transmission waveform.

9. The optical communication system according to claim 6, wherein the monitor-unit is configured to monitor a reception waveform indicating a relationship of an optical intensity to a wavelength or frequency of the optical signal.

10. The optical communication system according to claim 6, wherein the training optical signal is transmitted or received in at least one of a case in which a new optical communication apparatus is connected to the optical communication network, a case in which the optical communication network is inspected at each predetermined period, or a case in which a path in the optical communication network is changed.

11. An optical communication system comprising:

an optical communication network including a plurality of optical communication apparatuses connected via a transmission line that transmits a WDM signal light in which a plurality of optical signals are wavelength-division multiplexed; and a network management apparatus configured to manage the optical communication network, wherein the network management apparatus includes monitor unit configured to, when a second optical communication apparatus that has received an optical signal transmitted by a first optical communication apparatus converts the optical signal to a digital signal, monitor a reception waveform of the optical signal, and center wavelength controlling unit configured to, based on the monitored reception waveform, feedback-control a center wavelength of a transmission waveform of the optical signal that the first optical communication apparatus transmits, wherein the monitor unit is configured to monitor the reception waveform of a main optical signal transmitted or received while the optical communication network is in operation and the reception waveform of a training optical signal transmitted or received when the optical communication network is adjusted, and wherein a bandwidth of the training optical signal is set smaller than a bandwidth narrowed by a filter that selects a wavelength of the optical signal to be inserted into the WDM signal light or a wavelength of the optical signal to be split from the WDM signal light.

12. The optical communication system according to claim 11, wherein the monitor unit is configured to monitor, in the plurality of optical communication apparatuses, a bandwidth narrowed by a filter that selects a wavelength of the optical signal to be inserted into the WDM signal light or a wavelength of the optical signal to be split from the WDM signal light.

13. The optical communication system according to claim 11, wherein the monitor-unit is configured to monitor a bandwidth of the transmission waveform.

14. The optical communication system according to claim 11, wherein the monitor unit is configured to monitor a reception waveform indicating a relationship of an optical intensity to a wavelength or frequency of the optical signal.

* * * * *